(12) United States Patent
Rosemeyer

(10) Patent No.: US 7,832,779 B2
(45) Date of Patent: Nov. 16, 2010

(54) PROTECTIVE ACCESSORY BUMPER

(75) Inventor: William E. Rosemeyer, Gibsonia, PA (US)

(73) Assignee: Ibis Tek, LLC, Butler, PA (US)

( * ) Notice: Subject to any disclaimer, the term of this patent is extended or adjusted under 35 U.S.C. 154(b) by 160 days.

(21) Appl. No.: 12/378,875

(22) Filed: Feb. 20, 2009

(65) Prior Publication Data

US 2009/0218833 A1 Sep. 3, 2009

Related U.S. Application Data

(60) Provisional application No. 61/032,572, filed on Feb. 29, 2008.

(51) Int. Cl.
*B60R 19/48* (2006.01)

(52) U.S. Cl. ........................................ 293/115; 293/117

(58) Field of Classification Search ................. 293/102, 293/115, 117, 142, 143, 146, 148
See application file for complete search history.

(56) References Cited

U.S. PATENT DOCUMENTS

| 1,623,404 | A | * | 4/1927 | Girl | 293/115 |
|---|---|---|---|---|---|
| 1,779,661 | A | * | 10/1930 | Cleland | 293/115 |
| 1,884,228 | A | * | 10/1932 | Raskin | 293/115 |
| 6,318,773 | B2 | * | 11/2001 | Storer | 293/115 |
| 2001/0015559 | A1 | * | 8/2001 | Storer | 293/115 |
| 2004/0135385 | A1 | * | 7/2004 | Murray et al. | 293/142 |
| 2008/0203741 | A1 | * | 8/2008 | Hastings | 293/115 |

* cited by examiner

*Primary Examiner*—Lori L Lyjak
(74) *Attorney, Agent, or Firm*—Karen Tang-Wai Sodini

(57) ABSTRACT

An accessory bumper for use on a host vehicle, such as a security vehicle, for providing collision protection when the host vehicle performs PIT maneuvers. The accessory bumper includes protective elements on front side of the vehicle, for protecting both the accessory bumper and also minimizing damage to the host vehicle's engine and other critical components necessary for the operation of the vehicle.

7 Claims, 10 Drawing Sheets

PROTECTIVE ACCESSORY BUMPER

CROSS REFERENCE TO RELATED APPLICATIONS

Reference is made to and priority claimed from U.S. provisional application Ser. No. 61/032,572, filed on Feb. 29, 2008.

FIELD OF THE INVENTION

The present invention relates to vehicle protection devices, and more particularly to a new protective accessory bumper designed to minimize damage to security vehicles undertaking precision immobilization technique (PIT) maneuvers and engaging in other policing activities.

BACKGROUND OF THE INVENTION

Police officers are trained to perform PIT maneuvers, in which a police vehicle tries to end a car chase by hitting a suspect's vehicle and causing the suspect driver to lose control and stop. PIT is an acronym variously understood for Precision Immobilization Technique, Pursuit Intervention Technique, Parallel Immobilization Technique, or Precision Intervention Tactic. PIT maneuvers are standard training for police forces across the United States and in many other countries, and when done properly, are believed to end car chases quickly and safely.

It would be highly advantageous to provide a protective bumper to minimize costly damage to the bumper, engine, and cooling systems of the police vehicle.

SUMMARY OF THE INVENTION

The present invention provides a protective accessory bumper designed to minimizing damage to police vehicles undertaking PIT maneuvers and other policing activities, as well as damage from animal collisions. The present invention generally comprises a shock-absorbing, removable wrap-around structure attached to the frame of a host police vehicle, and a grill guard structure fixedly attached to the wrap-around structure for providing additional protection to the host vehicle's radiator grill, headlights and front fenders.

BRIEF DESCRIPTION OF THE DRAWINGS

The invention will be better understood and objects other than those set forth above will become apparent when consideration is given to the following detailed description thereof. Such description makes reference to the annexed drawings wherein.

DRAWINGS LIST OF REFERENCE NUMERALS

Figure 1:
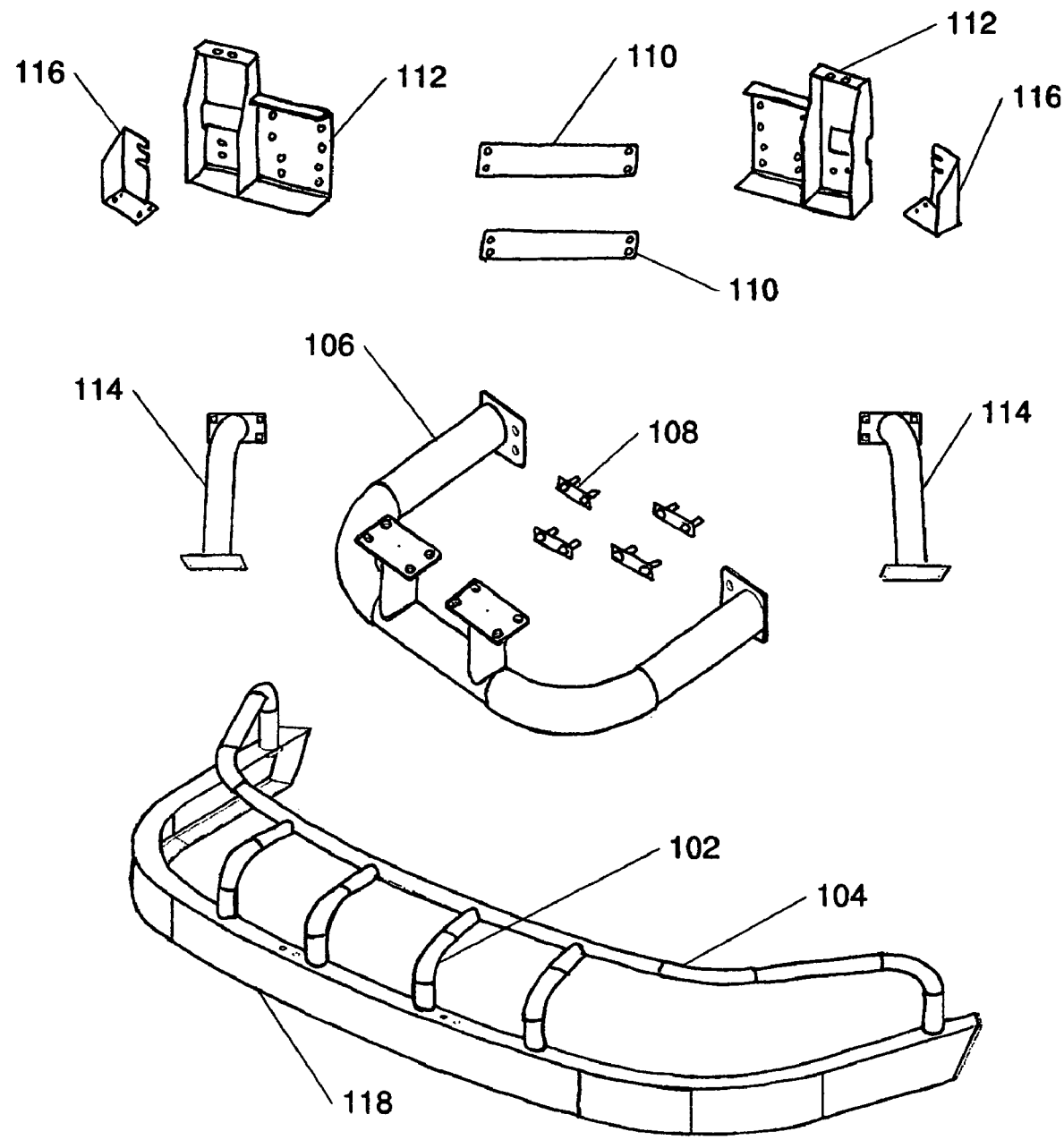
FIG. 1 is a top perspective view of a protective accessory bumper according to the invention suitable for use on a Ford Crown Victoria® host vehicle, including mounting hardware.

The following is a list of reference labels used in the drawings to label components of different embodiments of the invention, and the names of the indicated components.
100 protective accessory bumper
102 tubular grill guard element
104 tubular grill guard backbone
106 lower assembly member
108 lower assembly fastening member
110 upper bumper support
111 lower bumper assembly
112 first lower assembly bracket
114 lower assembly extension member
116 second lower assembly bracket
118 wrap-around protective element
202 fastening or mounting assembly
204 mounting surface of the protective element
206 striking surface
208 protective strip
402 skid plate
502 auxiliary tubular grill guard support member
600 host vehicle
602 existing hole in vehicle bumper

DETAILED DESCRIPTION

As illustrated in FIGS. 1 through 7, a protective accessory bumper 100 comprises a wrap-around protective element 118 having at least one mounting surface 204 and a striking surface 206. The protective element 118 may be a c-channel weldment or other structure (e.g. a casting or an extrusion), or any other suitable weldment or other structure. The protective element 118 may have a removable protective strip 208 applied to the striking surface 206. The protective strip 208 may be a rubber strip, or any other suitable strip and consists of a "hill and valley" profile as shown more particularly in FIG. 7. As illustrated in FIGS. 6A-D, the protective element 118 may be shaped so as to roughly conform to the profile of the front of a host vehicle 600 to which the protective accessory bumper 100 is attached.

The protective accessory bumper 100 further comprises a tubular grill guard extending from at least one of the at least one mounting surfaces 204 of the protective element 118. The grill guard may comprise a tubular grill guard backbone 104 having a first end and a second end, the first end extending from one end of the protective element 118 and a second end extending to the opposite end of the protective element 118. As shown in FIGS. 6A-D, the tubular grill guard backbone 104 may be shaped so as to roughly conform to the profile of the hood of the host vehicle to which the protective accessory bumper is attached. The grill guard may also include at least one tubular grill guard element 102 having two ends, the element 102 extending from at least one of the at least one mounting surfaces 204 of the protective element 118 to the tubular grill guard backbone 104. All embodiments of the invention suggest the use of four two-ended tubular grill-guard element 102. The grill guard may further comprise at least one auxiliary tubular grill guard support member 502, as shown more particularly in FIG. 5.

Figure 6A:
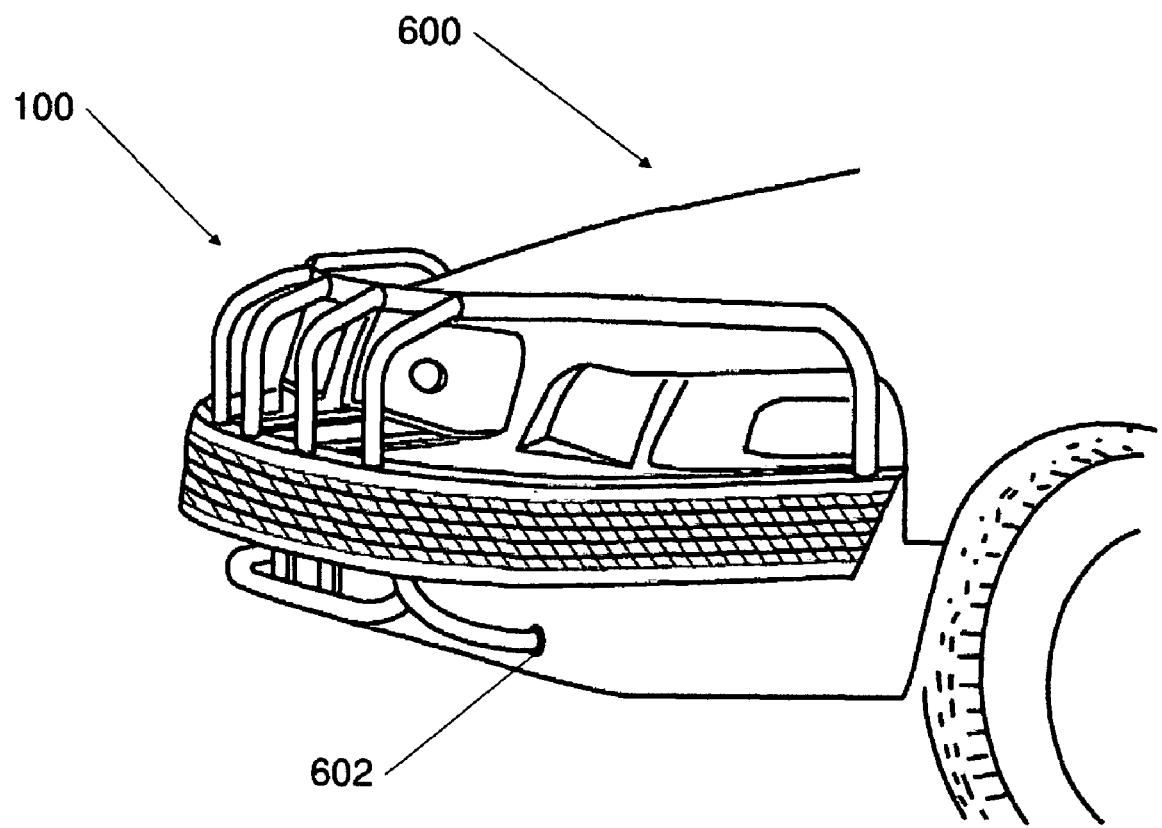
FIG. 6A is a perspective view of the present invention deployed on a Ford Crown Victoria® host vehicle.
Figure 6B:
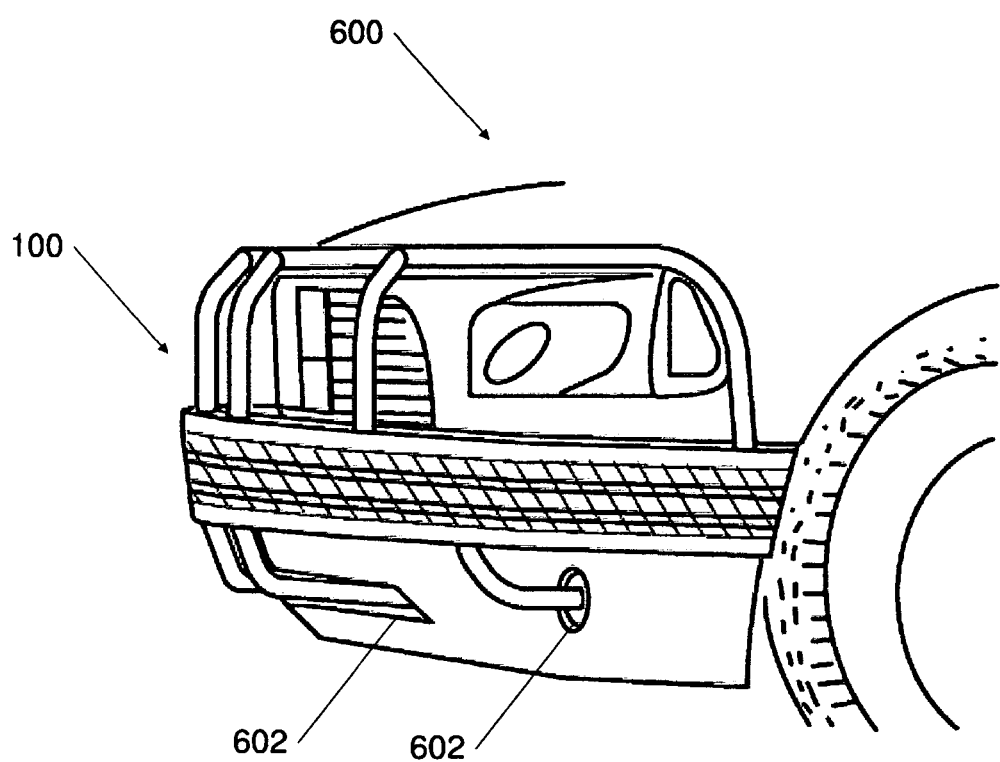
FIG. 6B is a perspective view of the present invention deployed on a Dodge Charger® host vehicle.
Figure 6C:
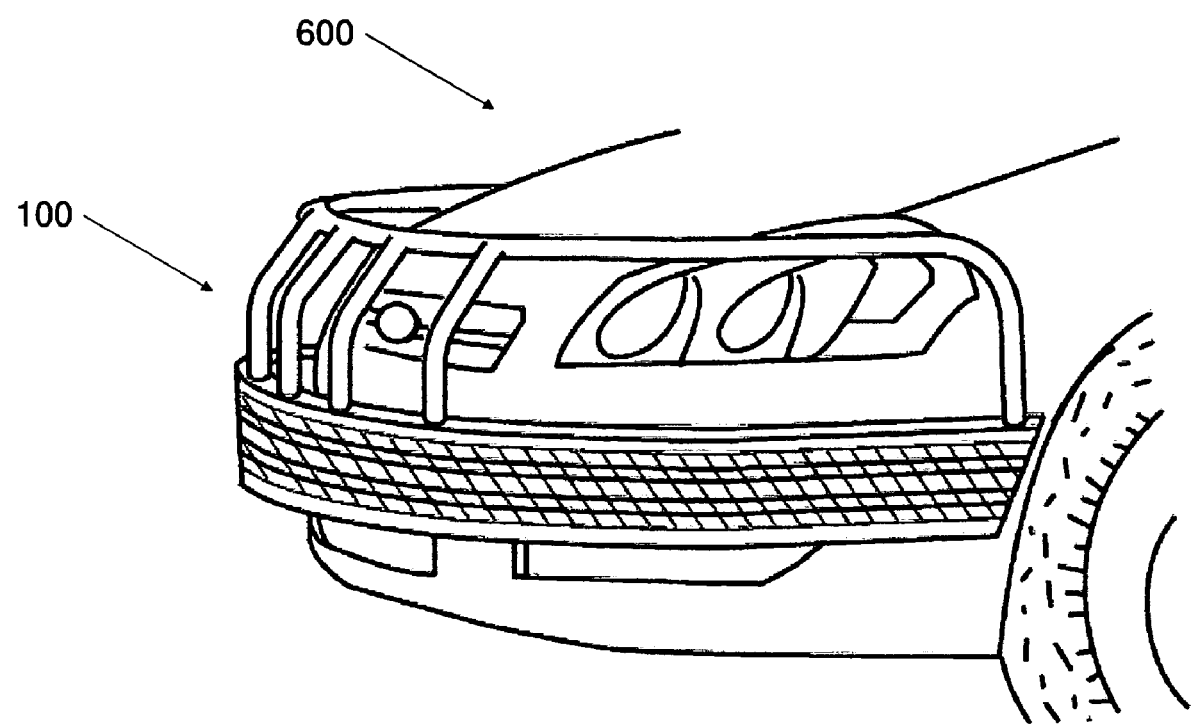
FIG. 6C is a perspective view of the present invention deployed on a Chevrolet Impala® host vehicle.
Figure 6D:
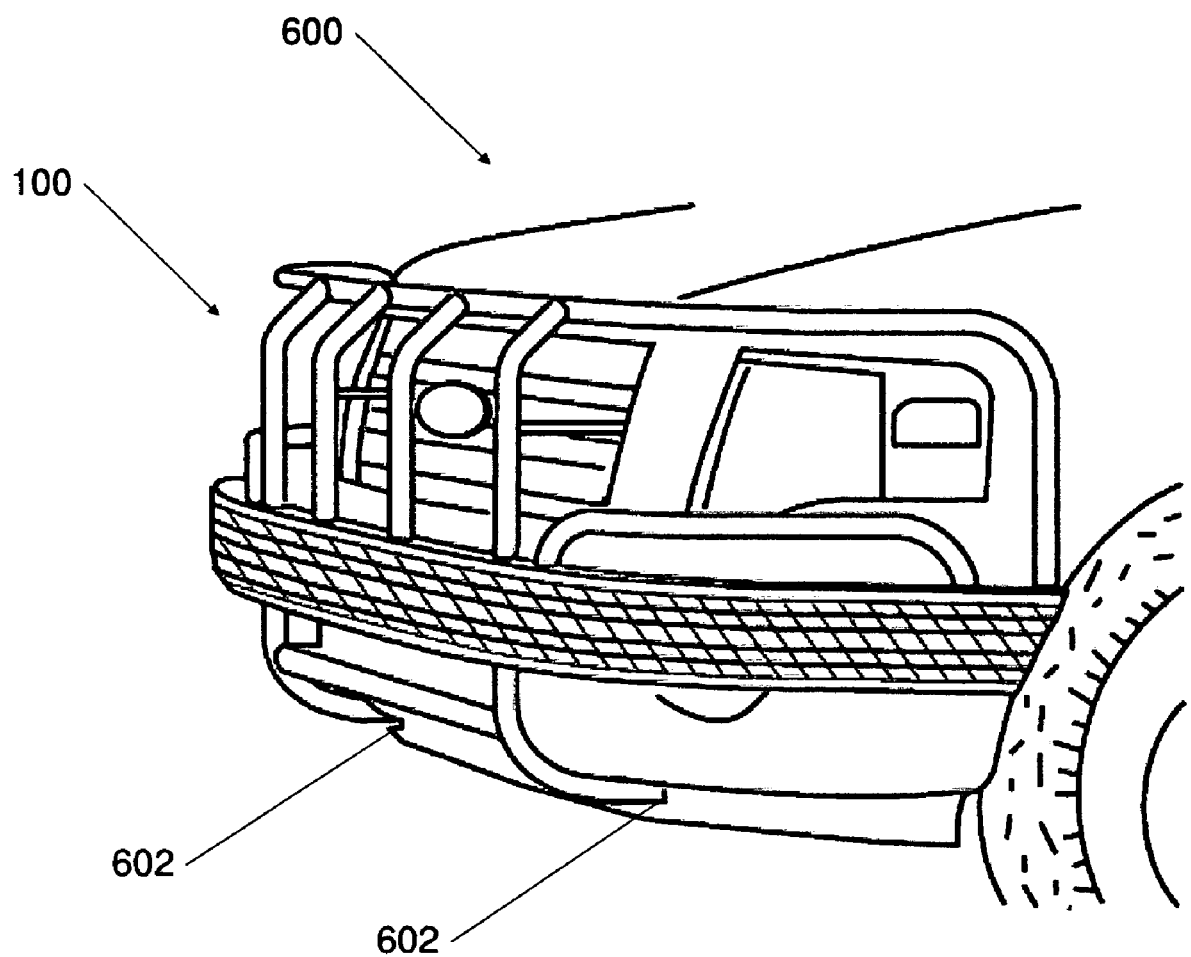
FIG. 6D is a perspective view of the present invention deployed on a Chevrolet Tahoe® host vehicle.
Figure 7:
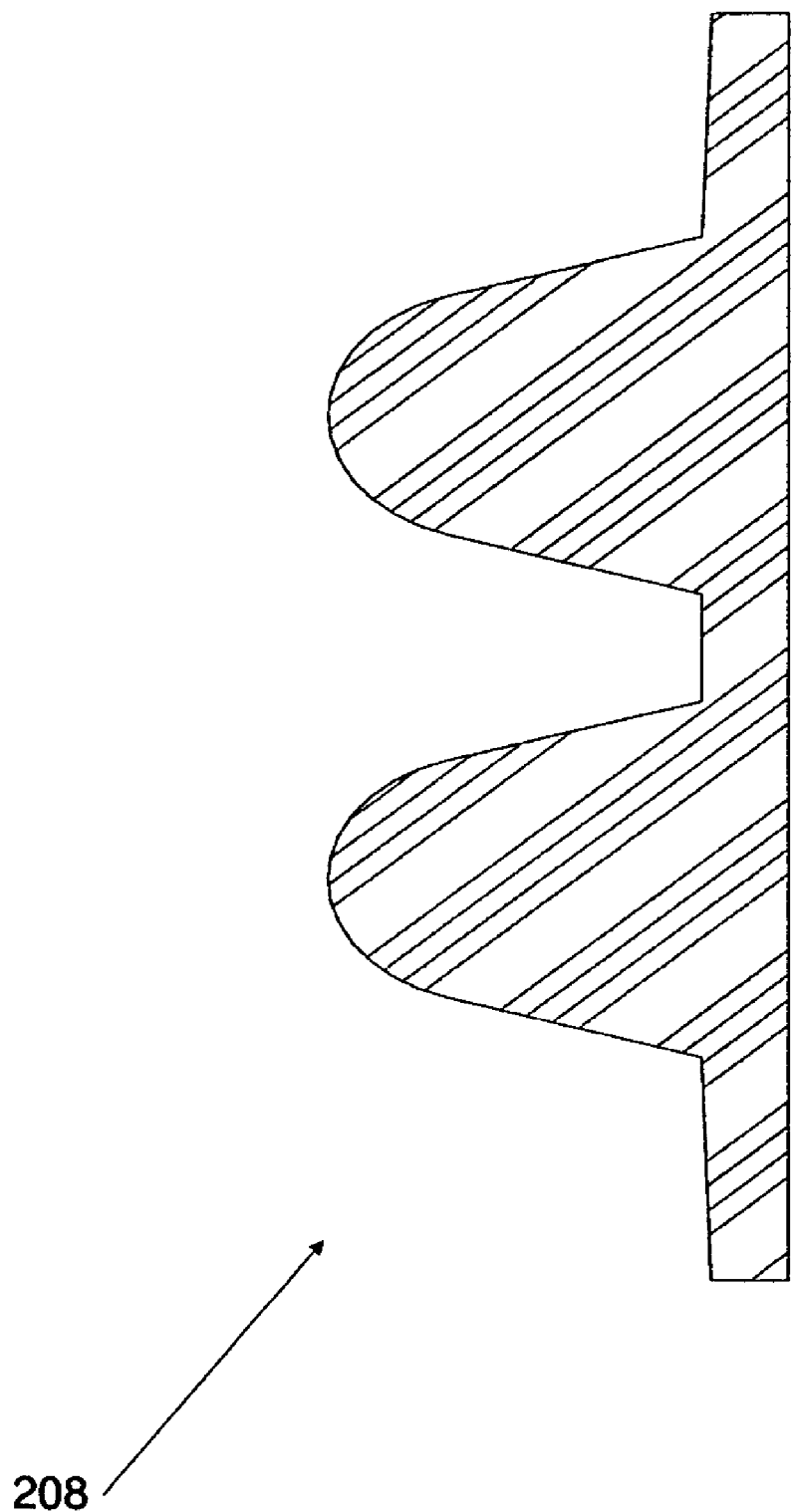
FIG. 7 is a cross-sectional view of the protective strip applied to the striking surface.

The protective accessory bumper 100 may further include a fastening or mounting assembly 202 for mounting the wrap-around protective element 118 to the frame of the host vehicle. The mounting assembly 202 may include an upper bumper support 110 and a lower bumper assembly 111. The lower bumper assembly 111 may comprise a lower assembly member 106 having a first end and a second end, a first and a second lower assembly brackets 112 116, a lower assembly extension member 114, and a lower assembly fastening member 108. The arrangement of the mounting assembly and the type of fastening supports used are largely dependent on the arrangement of mount points about the front and side surfaces of the host vehicle's frame. FIGS. 6A-D illustrate how the mounting assembly 202 uses existing holes in the host vehicle's bumper, such as air gaps or fog lighting holes 602, allowing the relevant mounting parts to penetrate through the vehicle bumper and attach to the frame of the vehicle. In the case of FIG. 6C, showing an embodiment of the invention as designed for a Chevy Impala©, access holes were drilled into the existing vehicle bumper in order to attach the relevant mounting members and brackets to the vehicle.

Figure 3:
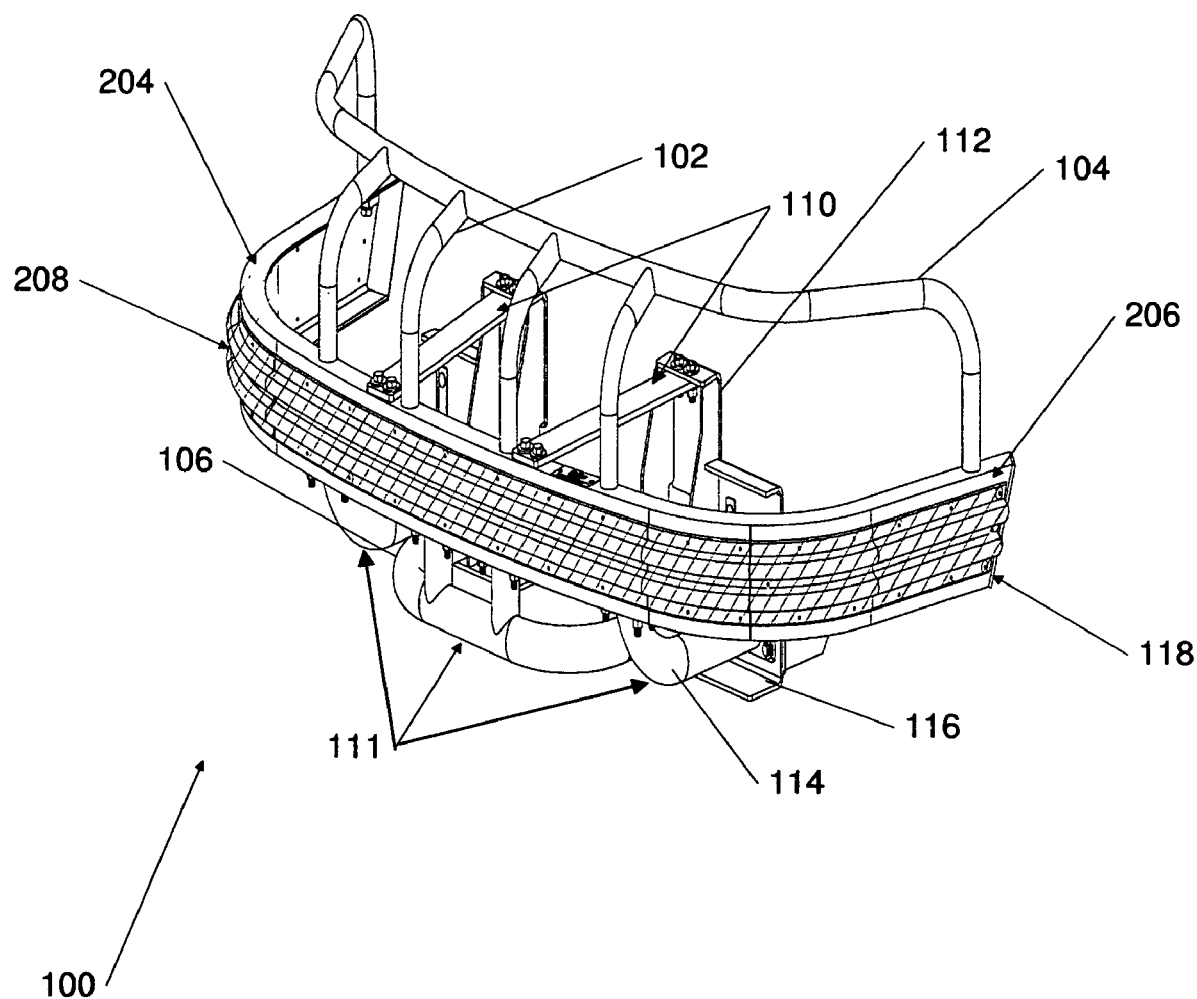
FIG. 3 is a perspective view of the present invention configured for use on a Ford Crown Victoria® host vehicle.
Figure 5:
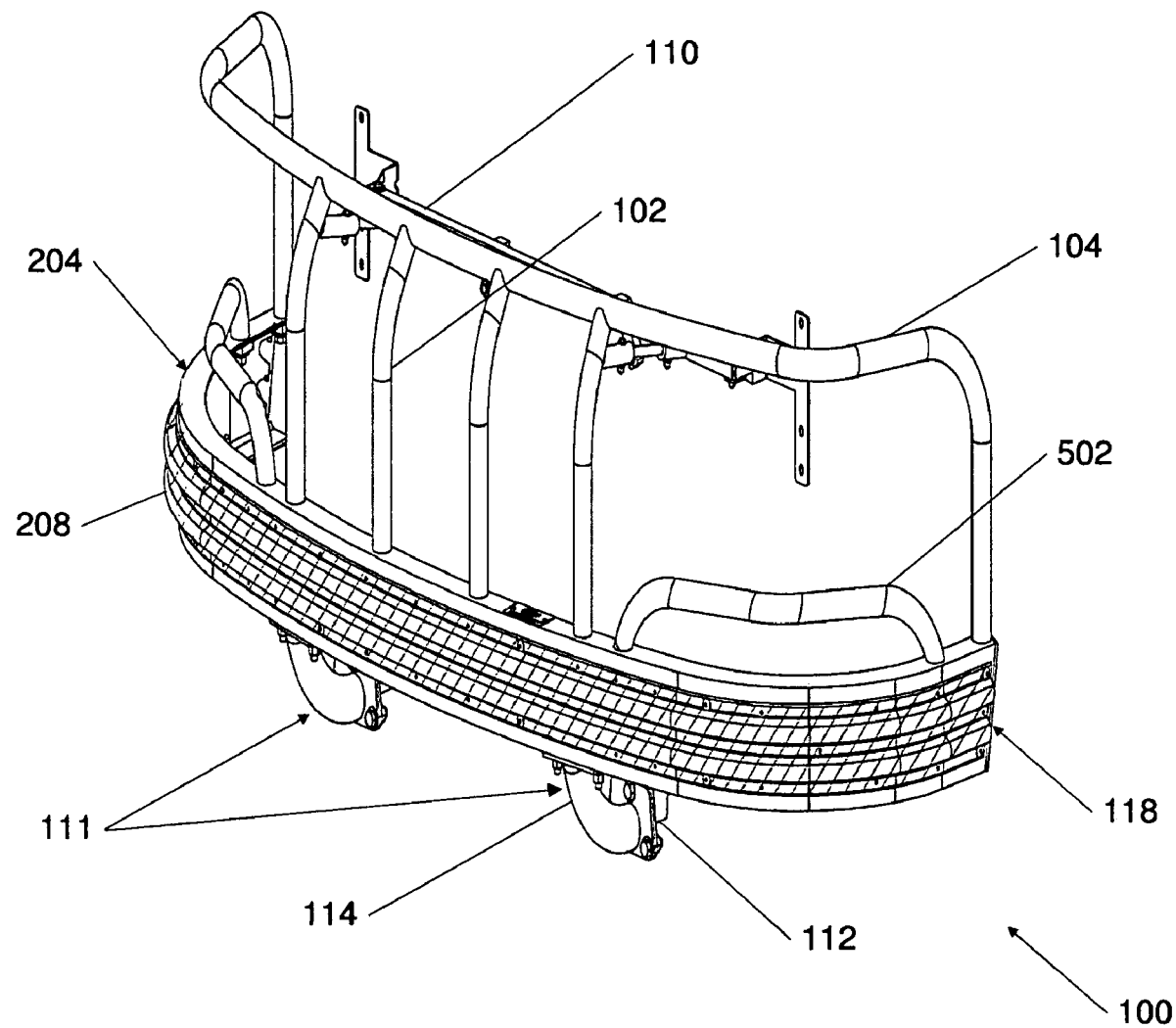
FIG. 5 is a perspective view of the present invention configured for use on a Chevrolet Tahoe® host vehicle.

For illustration purposes, in the embodiment of the invention shown more particularly in FIG. 3, the lower assembly member 106 is attached to the first lower assembly bracket 112 at the member's first end. The member 106 extends horizontally below the protective element 118 and attaches to a second assembly bracket 112 at the member's second end. The lower assembly member 106 is attached to the protective element 118 near the center of the member 106 by two vertical supports in spaced apart relation that are bolted to an underside of the protective element 118. Two lower assembly extension members 114 are located below the protective element 118, one on each side of the lower assembly member 106. Each extension member 114 has a first end and a second end, the first end connected to the second lower assembly bracket 116, and the second end of the extension member 114 connected to the underside of the protective element 118. At least one lower assembly fastening member 108 fastens the lower assembly 111 to the host vehicle's frame. In FIG. 5, the lower bumper assembly 111 comprises two extension members 114 in spaced apart relation, each member 114 having a first end and a second end, the first end attached to a first lower assembly bracket 112 and the second end attached to the underside of the protective element 118.

Figure 4:
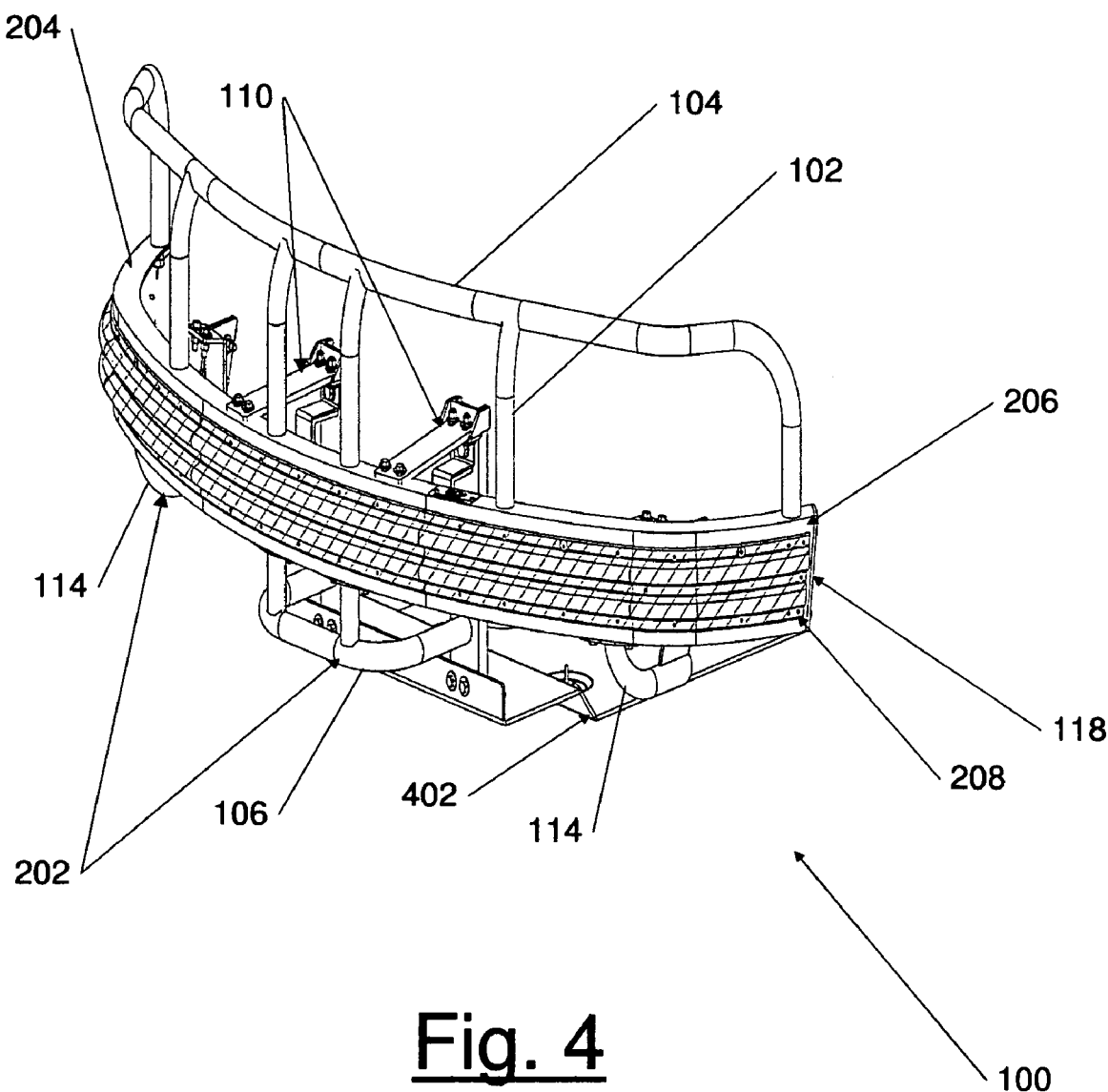
FIG. 4 is a perspective view of the present invention configured for use on a Dodge Charger® host vehicle.

The upper bumper support 110 may comprise a single flat, linear plate fastened to the host vehicle as shown in FIG. 5, or two flat, linear plates in parallel spaced apart relationship, each plate having a first end and a second end, the first end attached the mounting surface 204 of the protective element 118 and the second end attached to a first lower assembly bracket 112 as shown more particularly in FIG. 3, or to a vertical support that forms part of the lower bumper assembly 111, as shown more particularly in FIG. 4.

Figure 2:
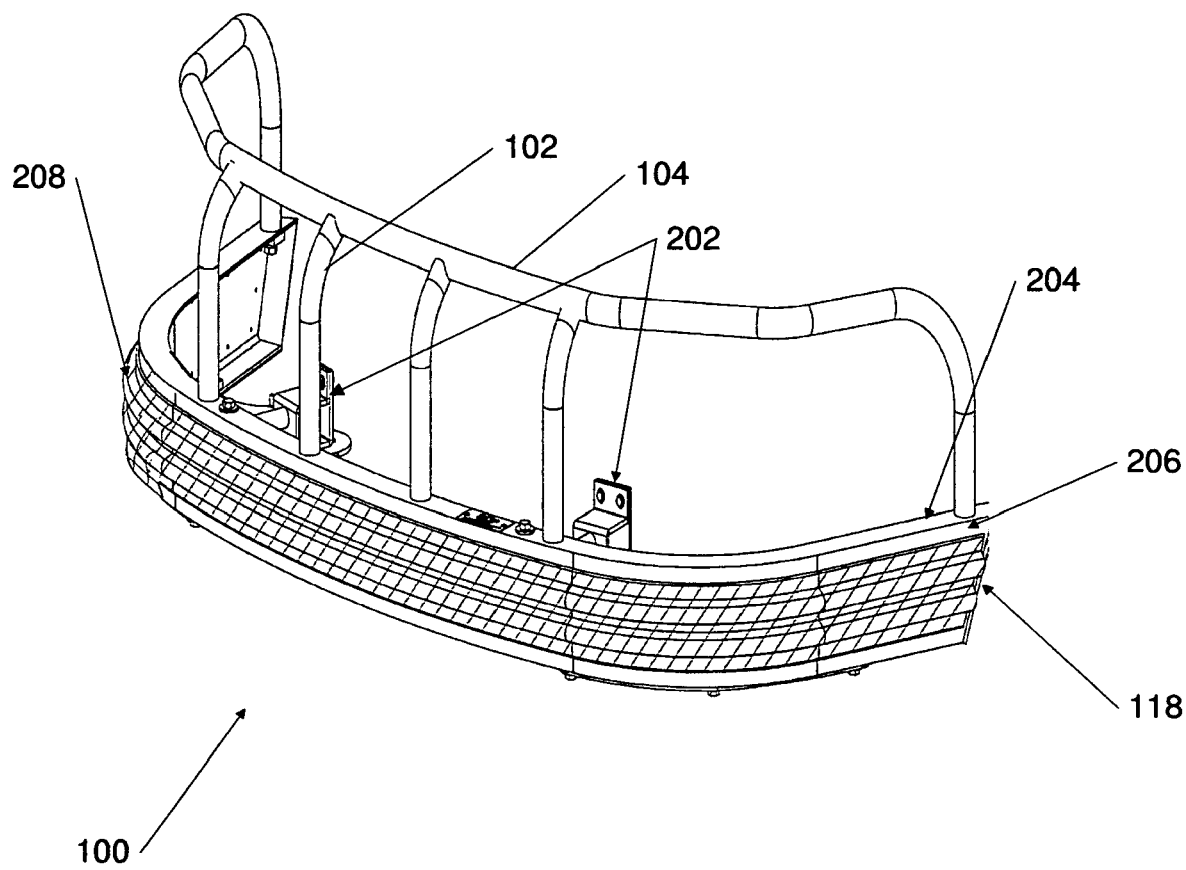
FIG. 2 is a perspective view of the present invention configured for use on a Chevrolet Impala® host vehicle.

The embodiments of the invention described herein are examples of the various ways in which the present invention may be practiced and should not be construed as limiting the invention to these embodiments. The mounting assembly 202 may comprise any combination of direct linkages as shown in FIG. 2, buttress-type linkages as shown in FIGS. 3-5, and also tensioned linkages as shown in FIGS. 3-5. FIG. 1 further illustrates that the mounting means may be disassembled into a number of component parts for easy storage and transportation. In some embodiments, such as the one shown more particularly in FIG. 4, a skid plate 402 may also be affixed to the mounting hardware to protect portions of the host vehicle's underside from damage by debris and scraping.

The protective accessory bumper may be constructed from aluminum, steel, titanium, composite material, or any other suitable material. Preferably the protective accessory bumper should extend across the front of the host vehicle 600 from one front wheel well to the other.

With respect to the above description, the optimum dimensional relationships for the parts of the invention include variations in size, shape, form, use, function, assembly, materials, and manner of operation and are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An accessory bumper (100) for use on a host vehicle (600), the host vehicle having a front surface and a side surface, the accessory bumper comprising:
 a wrap-around protective element (118) having at least one mounting surface (204) and a striking surface (206);
 a grill guard extending from the at least one mounting surface of the wrap-around element (118), the grill guard including a tubular grill guard backbone (104) extending from the at least one mounting surface (204) adjacent the ends of the wrap-around protective element (118), and at least one two-ended tubular grill-guard element (102) extending from the at least one mounting surface (204) of the wrap-around protective element (118) to the tubular grill guard backbone (104), wherein the grill guard assembly is provided so as to conform to the shape of the front surface of the host vehicle; and
 a mounting assembly (202) connecting the wrap-around protective element (118) to the front surface of the host vehicle.

2. The accessory bumper (100) of claim 1, wherein the wrap-around protective element (118) is a c-channel weldment.

3. The accessory bumper (100) of claim 1, wherein the wrap-around protective element (118) includes a protective strip (208) applied to the striking surface (206).

4. The accessory bumper (100) of claim 3, wherein the protective strip (208) is a removable attached rubber strip.

5. The accessory bumper (100) of claim 1, wherein the mounting assembly (202) connecting the wrap-around protective element (118) further comprises a skid plate (402) attached to a lower bumper assembly (111) and oriented along the side surface of the host vehicle.

6. The accessory bumper (100) of claim 1, wherein the mounting assembly (202) comprises a lower bumper assembly (111) and at least one upper bumper support (110).

7. The accessory bumper (100) of claim 1, wherein the grill guard further comprises at least one auxiliary tubular grill guard support member (502).

* * * * *